United States Patent
Feron et al.

(10) Patent No.: US 7,655,345 B2
(45) Date of Patent: Feb. 2, 2010

(54) FUEL CELL USING IN THE CATHODE COMPARTMENT AND OPTIONALLY IN THE ANODE COMPARTMENT OXYDOREDUCTASE ENZYMES

(75) Inventors: Damien Feron, Fontenay Aux Roses (FR); Alain Bergel, Toulouse (FR)

(73) Assignees: Commissariat a l'Energie Atomique, Paris (FR); Centre National de laRecherche Scientifique, Paris (FR)

(*) Notice: Subject to any disclaimer, the term of this patent is extended or adjusted under 35 U.S.C. 154(b) by 658 days.

(21) Appl. No.: 10/503,395

(22) PCT Filed: Feb. 5, 2003

(86) PCT No.: PCT/FR03/00354
§ 371 (c)(1),
(2), (4) Date: Mar. 11, 2005

(87) PCT Pub. No.: WO03/067697
PCT Pub. Date: Aug. 14, 2003

(65) Prior Publication Data
US 2005/0164073 A1  Jul. 28, 2005

(30) Foreign Application Priority Data
Feb. 7, 2002 (FR) .................................. 02 01488

(51) Int. Cl.
*H01M 4/00* (2006.01)
*H01M 2/10* (2006.01)
(52) U.S. Cl. ......................................... 429/43; 429/30
(58) Field of Classification Search .................. 429/43, 429/30, 2
See application file for complete search history.

(56) References Cited

U.S. PATENT DOCUMENTS
6,294,281 B1   9/2001  Heller
6,500,571 B2 * 12/2002  Liberatore et al. ............. 429/2

FOREIGN PATENT DOCUMENTS
WO   WO 00 22688 A   4/2000

OTHER PUBLICATIONS

Patent Abstracts of Japan, vol. 006, No. 147 (E-123), Aug. 6, 1982 & JP 57 069668 A (Matsushita Electric Ind. Co. Ltd., Apr. 28, 1982.
G. Tayhas et al.: "Electro-Enzymatic Reduction of Dioxagen to Water in the Cathode Compartment of a Biofuel Cell", Journal of Electroanalytical Chemistry, vol. 464, 1999, pp. 110-117, XP002221000.
E. Katz et al.: "A Biofuel Cell Based on Two Immiscible Solvents and Glucose Oxidase and Microperoxidase-11 Monolayer-Functionalized Electrodes", New Journal of Chemistry, 1999, pp. 481-487, XP002221001.

* cited by examiner

*Primary Examiner*—Patrick Ryan
*Assistant Examiner*—Thomas H. Parsons
(74) *Attorney, Agent, or Firm*—Pearne & Gordon LLP

(57) ABSTRACT

A proton exchange membrane fuel cell comprises an cathodic compartment including a cathode, an oxidant consisting of oxygen and at least one enzyme catalyst, an anodic compartment comprising an anode, a fuel and at least one catalyst. The anodic and cathodic compartments are arranged at either end of the membrane. The cell is characterized in that the enzyme catalyst of the anodic compartment is an oxidoreductase type enzyme capable of catalyzing the reduction of oxygen into hydrogen peroxide and the hydrogen peroxide is a direct receptor of the electrons from the cathode.

12 Claims, 1 Drawing Sheet

FUEL CELL USING IN THE CATHODE COMPARTMENT AND OPTIONALLY IN THE ANODE COMPARTMENT OXYDOREDUCTASE ENZYMES

FIELD OF THE INVENTION

The present invention relates to a proton exchange membrane fuel cell, using oxidoreductase type enzymes in the cathodic and possibly anodic compartments.

Therefore, the general field of the invention is that of proton exchange membrane fuel cells.

STATE OF THE RELATED ART

A fuel cell generally comprises a stack of elementary cells, wherein electrochemical reactions take place with two reagents which are introduced continuously. The fuel, such as hydrogen, for cells operating with hydrogen/oxygen mixtures or methanol for cells operating with methanol/oxygen mixtures, and ethanol for cells operating with ethanol/oxygen mixtures, is placed in contact with the anode, while the oxidant, generally oxygen, is placed in contact with the cathode. The anode and the cathode are separated by an ion exchange membrane type electrolyte. The electrochemical reactions, the energy of which is converted into electrical energy, are split into two half-reactions:

- oxidation of the fuel, occurring an the anode/electrolyte interface producing, in the case of H+ proton hydrogen cells, which pass through the electrolyte in the direction of the cathode, and producing electrons, which join the external circuit, in order to participate in the electrical energy production;
- reduction of the oxidant, occurring at the electrolyte/cathode interface, with water production, in the case of hydrogen/oxygen cells.

These two reactions have slow kinetics, resulting in the implementation of mineral catalysts, such as platinum-based metallic catalysts, on the anodes and cathodes, to increase the kinetics of these reactions.

However, such catalysts are less effective at low temperatures, which may lead to cell start-up problems and induce an overload of the catalyst electrodes, in order to accelerate said start-up. In addition, these catalysts, essentially based on inert metals, are costly products and represent potential environmental pollutants.

Finally, these mineral catalysts carry out very satisfactory activation of the anodic reaction, while the cathodic reaction still remains difficult to catalyse by this means. For this reason, the cathodic reaction represents a limiting step to the correct operation of a fuel cell.

At the present time, research relates, particularly with respect to gas diffusion cells, to new arrangements or combinations of existing catalysts, in order to increase the reactivity of these catalysts. It is specified that the term gas diffusion cell heretofore and hereafter refers to a cell for which the oxidant and the fuel supply their respective compartments directly in the form of a gas flow.

In the case of cells operating in an aqueous medium, the research relates to the improvement of the anodic and cathodic kinetics through the use of whole organisms such as bacteria, or through the use of complex enzyme systems grafted onto electrodes, for example made of platinum or graphite. The term cell operating in an aqueous medium heretofore and hereafter refers to a cell wherein the anodic and cathodic compartments are filled with water, the oxidant and fuel thus arriving at its respective compartments in dissolved form.

In this way, the document [1]: Journal of Electroanalytical Chemistry 464 (1999), pp 110-117, describes the use of a laccase type enzyme, intended to catalyse the reduction of oxygen into water in the cathodic compartment of a fuel cell operating in an aqueous medium. This document specifies that the use of a laccase alone to carry out oxygen reduction does not improve the current densities of the cell, in that the electron transfer between the cathode and enzyme is carried out according to very slow kinetics. In order to overcome this drawback, the inventors used an electrochemical mediator dissolved in the electrolyte, which carries out a rapid transfer of the electrons from the cathode to the active site of the laccase. This mediator is 2-2'-azinobis(3-ethylbenzothiazoline-6-sulphonate). However, this mediator is not only costly but is also degraded prematurely due to free radical production, during the transfer of electrons between the cathode and the active site of the enzyme, via said mediator.

The document [2]: New J. Chem., 1999, pp. 481-487, describes fuel cells using glucose as a fuel and cumene peroxide as an oxidant and involving electrode surfaces functionalised by a suitable enzyme system. In this way, at the anodic end, the inventors grafted, on the surface of the anode in contact with the glucose, a monolayer comprising an enzyme system consisting of an electrochemical mediator referenced $MB^+$ associated with a flavoprotein type coenzyme, such as FAD, in turn associated with a glucose oxidase Gox. In this way, the glucose is oxidised, under the effect of glucose oxidase Gox into gluconic acid. The electrons and protons produced are transferred successively to the glucose oxidase associated with the FAD coenzyme to give a Gox-$FADH_2$ type reduced system, followed by the mediator to give $MBH_2$, which finally transfers the electrons to the external circuit, in the direction of the cathodic compartment. Similarly, at the cathodic end, the inventors grafted on the surface of the cathode in contact with the cumene peroxide a monolayer consisting of a microperoxidase intended to carry out the reduction of the cumene peroxide.

However, the functionalised surfaces of these electrodes are unstable and difficult to use in industrial environments. In addition, the use of cumene peroxide as an oxidant cannot be envisaged at a large scale.

The embodiments of the prior art all involve one or more of the following drawbacks:
- they require the use of a large quantity of mineral catalysts, to catalyse the cathodic reaction;
- they require, when an enzyme is used, complex functionalisation of the surface of the cathode, whereto the enzyme must be fixed to accept the electrons from said cathode.

DESCRIPTION OF THE INVENTION

Therefore, the aim of the present invention is to offer a fuel cell not involving the above mentioned drawbacks.

In this way, the inventors of the present invention discovered, surprisingly, that by using a specific enzyme catalyst in the cathodic compartment of a fuel cell, it was possible to no longer need to use functionalisation of the surface of the cathodes, and also to limit, or even completely eliminate, the use of mineral catalysts from the cathodic reaction.

To this end, the invention relates to a proton exchange membrane fuel cell comprising:
- a cathodic compartment comprising a cathode, an oxidant consisting of oxygen and at least one enzyme catalyst;

an anodic compartment comprising an anode, a fuel and at least one catalyst, said anodic and cathodic compartments being arranged at either end of said membrane, said cell being characterised in that said enzyme catalyst of the cathodic compartment is an oxidoreductase type enzyme, said enzyme being capable of catalysing the oxidation of a suitable substrate and the reduction of oxygen into hydrogen peroxide, said hydrogen peroxide fulfilling the role of direct acceptor of the electrons from the cathode.

It is specified that, according to the invention, the term oxidoreductase refers to an enzyme capable of catalysing an oxidation reaction of a first substrate (referred to as a suitable substrate within the scope of the invention) and a reduction reaction of a second substrate (consisting of oxygen within the scope of this invention).

As mentioned above, the oxidoreductase type enzyme catalyst incorporated in the cathodic compartment catalyses the oxidation reaction of a suitable substrate and the reduction reaction of oxygen into hydrogen peroxide, said hydrogen peroxide being capable of accepting electrons from the cathode directly without requiring the use, for example, of any electrochemical mediator.

Unlike the embodiments of the prior art, wherein the enzyme catalysts present in the cathodic compartment helped improve the electron transfer kinetics between the cathode and the oxidant, the oxidoreductase type enzyme catalyst according to the invention takes part in the hydrogen peroxide production reaction (corresponding within the scope of the invention to the oxidant of the cathodic reaction), said hydrogen peroxide taking part directly in the cathodic reaction by accepting the electrons from the cathode to be reduced to water. Given that the specific enzyme catalyst according to the invention is no longer involved in the cathode electron acceptance mechanism, this makes it possible to simplify the design of said cathode greatly with respect to prior embodiments. In this way, it is no longer necessary to create electron bonds between the cathode and the enzyme, the creation of such bonds requiring perfect control of the surface condition of the cathode and operating conditions (type of electrolyte, for example) to enable the adsorption, for example, of the enzyme on the surface of the cathode.

In addition, the enzyme catalysts, according to the invention, favour catalysis of the reduction of oxygen into hydrogen peroxide and oxidation of a suitable substrate at ambient temperature, which facilitates the start-up of the fuel cell. Finally, the catalysis of the abovementioned reactions, induced by enzyme catalysts according to the invention, decreases from a certain temperature threshold. In this way, when a temperature must not be exceeded, it is possible to select a suitable oxidoreductase enzyme, liable to react in a more limited manner at a given temperature. The implementation of the present invention may thus make it possible to obtain intrinsic safety of the cell, by using a given enzyme.

The enzyme catalysis, according to the invention, is also perfectly adjustable. In fact, the abovementioned reactions will only be catalysed, if the suitable substrate and oxygen are added into the cathodic compartment, the suitable substrate corresponding to glucose, when oxidoreductase corresponds to glucose oxidase. It is then envisageable to adjust this addition according to the requirements of the user of the cell.

Finally, using enzymes, which are not involved in the acceptance of the electrons from the cathode, may make it possible to replace the electrodes conventionally used in prior embodiments (such as electrodes made of graphite or inert metals, such as platinum and gold) by electrodes made of industrial materials or alloys such as stainless steels, aluminium, nickel or titanium alloys or conductive polymer materials. Preferentially, the cathode according to the invention is made of stainless steel.

In addition, the enzyme catalysts according to the invention offer the advantage of being inexpensive and not degrading prematurely.

As mentioned above, the enzymes, according to the invention, capable of reducing dioxygen are oxidoreductases, which, according to the current nomenclature, are identified by an EC number of the type EC 1.X.3.Y, where 1 refers to the oxidoreductase class, X characterises the electron donor substrate, 3 refers to oxygen as the electron acceptor substrate, Y specifically refers to an enzyme, which is included in the subclass defined by the above three numbers. It is understood that, according to the invention, these enzymes should catalyse the reduction of oxygen into hydrogen peroxide.

In addition to carrying out reduction of oxygen into hydrogen peroxide, it is possible to envisage, according to the invention, oxidoreductase type enzymes also capable, by means of a reaction with said suitable substrate, of inducing an acidification of the cathodic compartment, said acidification facilitating the reduction of oxygen into hydrogen peroxide and subsequently the reduction of hydrogen peroxide into water on the surface of the cathode. This phenomenon is particularly advantageous when the cathode is made of stainless steel, in that the acidification of the cathodic compartment may make it possible to activate the surface of the cathode, with a view to facilitating the reduction of hydrogen peroxide into water.

For example, the oxidoreductase type enzymes may be selected from the group consisting of galactose oxidase, glucose oxidase, pyruvate oxidase, glutamate oxidase, alcohol oxidases. For the above mentioned enzymes, it is understood that the suitable substrates are respectively galactose for galactose oxidase, glucose for glucose oxidase, pyruvate for pyruvate oxidase, glutamate for glutamate oxidase, an alcohol for alcohol oxidases.

The EC numbers of these enzymes are respectively EC 1.1.3.4 for glucose oxidase, EC 1.1.3.9 for galactose oxidase, EC 1.2.3.3 for pyruvate oxidase, EC 1.4.3.7 for glutamate oxidase.

Preferentially, the oxidoreductase type enzyme used in the cathodic compartment is glucose oxidase.

For glucose oxidase, the active site of said oxidase induces the oxidation of the glucose substrate into glucono-1,4-lactone which is subsequently hydrolysed into gluconic acid. Concomitantly, the said active site induces the reduction of oxygen into hydrogen peroxide which is subsequently reduced into water by the electrons arriving from the cathode, the acidification of the cathodic compartment by gluconic acid favouring these two successive reductions.

Glucose oxidase also offers the advantage of making it possible to form an intrinsic safety device of the cell, in that glucose oxidase is no longer active at around 70° C. Therefore, it is of particular interest for applications involving a cell, according to the present invention, where this temperature must not be exceeded.

For the anodic compartment, the catalysis of the anodic reaction (i.e. the oxidation reaction of a fuel) may be carried out using any type of catalysts, including metallic catalysts.

However, very advantageously, the catalyst of the anodic compartment is, according to the invention, an enzyme capable of catalysing the oxidation of a suitable substrate, said substrate acting as a fuel.

Preferentially, the enzyme of the anodic compartment is also capable, by means of a reaction with said substrate, of carrying out acidification of the anodic compartment.

In the same way as for the cathodic compartment, using an enzyme as a catalyst makes it possible to limit, or even eliminate, the mineral catalyst load.

In this way, the enzyme of the anodic compartment may be selected from the group consisting of hydrogenases, glucose oxidase, galactose oxidase, alcohol oxidases. It is understood that the substrates for the list of enzymes mentioned are respectively hydrogen, glucose, galactose, suitable alcohols.

It should be noted that some of these enzymes, such as glucose oxidase, consume dioxygen in order to function. For this reason, it will not be necessary to purge said compartment of its dioxygen, as is the case when hydrogen serves as the fuel.

Advantageously, according to the invention, the enzyme of the anodic compartment is glucose oxidase and the fuel glucose.

The oxidation of glucose by this enzyme produces glucono-1,4-lactone, which is hydrolysed into gluconic acid, thus releasing protons, required for the operation of the cell. These protons are carried, in particular, in the direction of the cathodic compartment via the proton exchange membrane.

It is specified that, given that the enzyme of the anodic compartment according to the invention plays a direct role in the anodic reaction, i.e. in the transfer of electrons from the fuel to the anode, this enzyme is advantageously immobilised on the surface of the anode. The enzyme may be immobilised by conventional means known to those skilled in the art such as simple adsorption, a co-cross-linking reaction with glutaraldehyde, inclusion in Nafion type polymer membranes or in surfactant layers deposited on the anode, electrostatic interactions with polyions adsorbed on the surface of the anode, grafting by covalent bonding.

The use of such a system also offers the advantage of no longer requiring the use of hydrogen, which may pose supply and safety problems.

The present invention may be applied equally well to gas diffusion cells and to cells operating in an aqueous medium.

With respect to the introduction of enzyme catalysts and substrates in the electrode compartments (i.e. anodic and cathodic), various alternatives may be envisaged.

According to a first alternative, the enzyme(s) of the anodic and/or cathodic compartment and the substrate(s) may be introduced continuously or discontinuously into the respective compartments during the operation of the cell. For example, for a cell operating by means of gas diffusion, the enzymes may be introduced in the form of aerosols with suitable substrates.

According to a second alternative, the enzyme(s) of the anodic and/or cathodic compartment are adsorbed on the anode and/or on the cathode.

Finally, for cells operating in aqueous media, the enzyme(s) are, according to a particular embodiment, introduced directly into the aqueous medium of the anodic and/or cathodic compartment, during the assembly of the cell.

The invention will now be described with reference to the examples, given for illustrative and not limitative purposes.

DETAILED DESCRIPTION OF PARTICULAR EMBODIMENTS

Example 1

Figure 1:
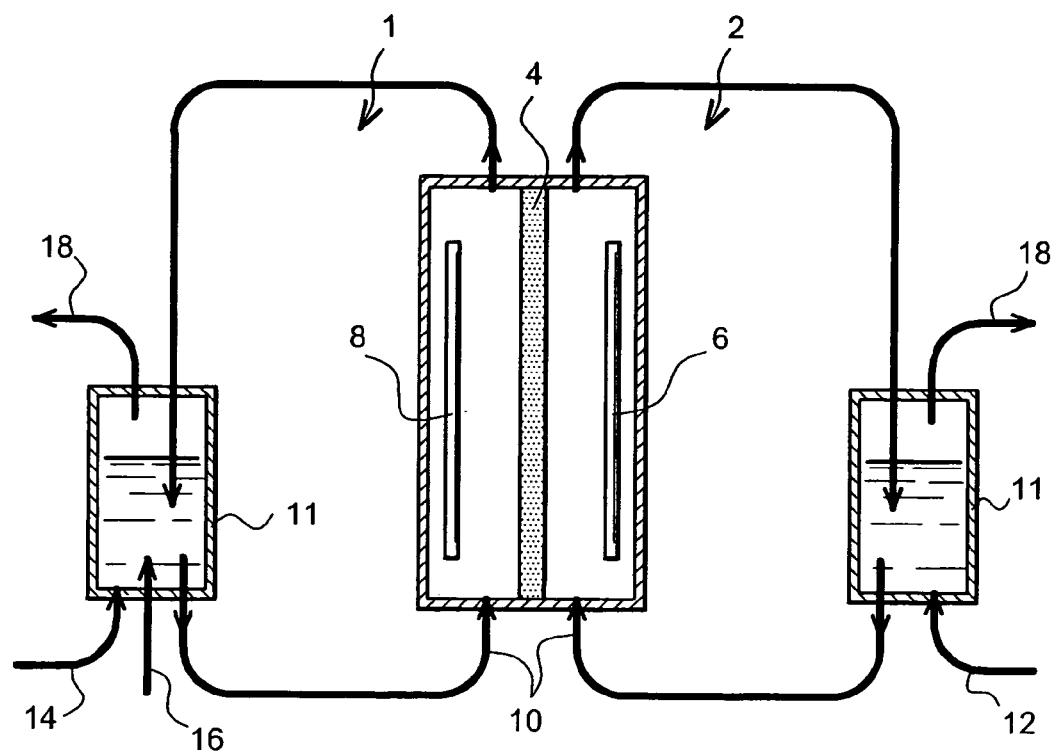
FIG. 1 represents the diagram of a cell, according to the invention, operating in an aqueous environment.

The cell used, in this example, is a cell operating in an aqueous environment and is represented in FIG. 1.

This cell comprises respectively a cathodic compartment 1 and an anodic compartment 2 separated by a proton exchange membrane 4. The electrodes are respectively a platinum grid for the anode 6 and a stainless steel plate for the cathode 8.

A water flow 10 from tanks 11, said flows being previously saturated with dihydrogen for the flow intended for the anodic compartment 2 and with dioxygen for the flow intended for the cathodic compartment 1, arrives at each compartment.

According to this example, the saturation of the water flow with dihydrogen or dioxygen is carried out by bubbling the respective gases in the water of the tanks 11, said gases being routed to the tanks 11 via a dioxygen inlet 14 at the cathodic end and by a dihydrogen inlet 12 at the anodic end.

In addition, according to this example, glucose and glucose oxidase are introduced into the tank 11 at the cathodic end via an inlet 16 positioned in the vicinity of the oxygen inlet 14. On each tank 11, outlets 18 are provided to replenish the aqueous medium.

Under such conditions and for glucose concentrations of 24.4 mM and glucose oxidase concentrations of 2.0 U/ml, the output supplied is 70 to 280 times greater in the presence of glucose oxidase than with none, for different electrical resistance values are presented in table 1 below.

TABLE 1

| Resistance | 1 Ω | 10 Ω | 100 Ω | 1000 Ω |
|---|---|---|---|---|
| Ratio (Output with enzyme/output without enzyme) | 280 | 260 | 170 | 70 |

Example 2

The cell used in this example is similar to the cell in FIG. 1 described above.

However, the cell according to this example differs on the following points:
- glucose replaces dihydrogen as the fuel, at the anodic end;
- the anode 6 is made of stainless steel
- glucose oxidase is grafted directly onto the surface of the anode 6.

In this way, according to this example, it is no longer necessary to require the use of an inert material for the composition of the anode, due to the fact that the catalysis at the anode end is no longer carried out by metal catalysts and dihydrogen is no longer used, but glucose, which is easier to handle.

Example 3

Figure 2:
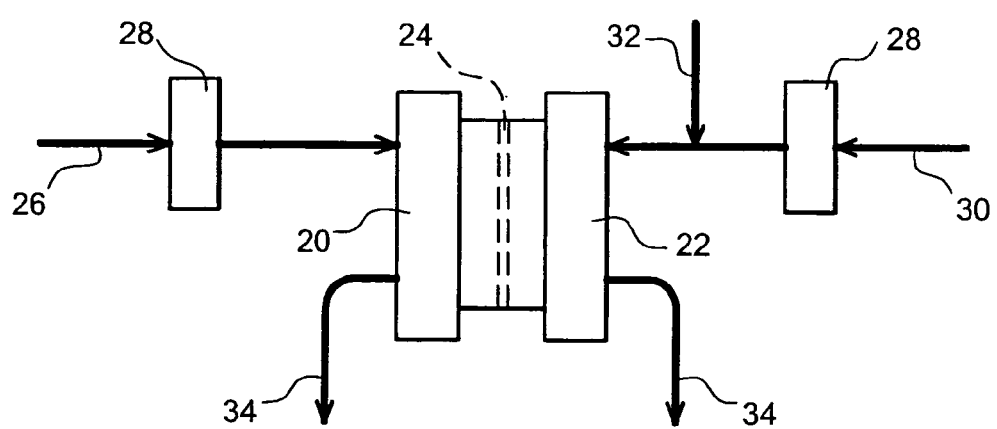
FIG. 2 represents the diagram of a gas diffusion cell, according to the invention, with catalysis of the cathodic reaction by glucose oxidase.

The cell used, in this example, is represented in FIG. 2.

This cell comprises respectively an anodic compartment 20 and a cathodic compartment 22 separated by a proton exchange membrane 24, the anode and the cathode being made of graphite. In both compartments, platinum (1 mg/cm$^2$) is used. The anodic compartment 20 is equipped with a dihydrogen inlet 26 which passes prior to its introduction into the compartment through a humidifier device 28, while the cathodic compartment is equipped with a dioxygen inlet 30 passing through a humidifier device 28 and laterally a glucose and glucose oxidase inlet 32. In this way, the enzyme and its substrate are injected in operation, which particularly makes it possible to adjust the intensity of the catalysis of the cathodic reaction, therefore the operation of the cell, by modulating the quantity of glucose injected. The catalysis of the anodic reaction is carried out by the platinum. In each compartment, outlets 34 are provided to replenish the oxidant and fuel, enzymes and substrates.

In the embodiment, the glucose and glucose oxidase inlet 32 is used to inject 1 ml of a solution containing 20 mM of glucose and the glucose oxidase content indicated in table 2, at the start of operation of the cell.

TABLE 2

| Glucose oxidase concentration | 0 unit/l | 1 unit/l | 10 units/l | 100 units/l |
|---|---|---|---|---|
| Ratio (Output with enzyme/output without enzyme) | 1 | 1.15 | 1.15 | 1.28 |

It is observed that, under such conditions, the addition of enzymes makes it possible to increase the catalysis of the cathodic reaction and therefore the output of the cell from 15% (with 1 or 10 units/l) to 28% (with 100 units/l).

This result is remarkable in that it demonstrates that the addition of enzyme makes it possible to improve the performances of a cell which, however, uses a platinum catalyst at standard quantities for commercial cells.

The invention claimed is:

1. Proton exchange membrane fuel cell comprising:
a cathodic compartment comprising a cathode, an oxidant consisting of oxygen and at least one enzyme catalyst;
an anodic compartment comprising an anode, a fuel and at least one catalyst, said anodic and cathodic compartments being arranged at either end of said membrane, said cell being characterized in that said enzyme catalyst of the cathodic compartment is an oxidoreductase enzyme which is glucose oxidase, said enzyme being capable of catalyzing the oxidation of suitable substrate and the reduction of oxygen into hydrogen peroxide, said hydrogen peroxide fulfilling the role of direct acceptor of the electrons from the cathode.

2. Fuel cell according to claim 1, characterized in that the oxidoreductase type enzyme is also capable, by means of a reaction with said suitable substrate, of carrying out acidification of the cathodic compartment.

3. Fuel cell according to claim 1, characterized in that the cathode is made of a material selected from the group consisting of stainless steels, aluminium, nickel or titanium alloys, conductive polymers.

4. Fuel cell according to claim 1, characterized in that the catalyst of the anodic compartment is an enzyme capable of catalyzing the oxidation of a suitable substrate, said substrate serving as a fuel.

5. Fuel cell according to claim 4, characterized in that the enzyme of the anodic compartment is also capable of carrying out, by means of a reaction with said suitable substrate, acidification of the anodic compartment.

6. Fuel cell according to claim 4, characterized in that the enzyme of the anodic compartment is selected from the group consisting of hydrogenases, glucose oxidase, galactose oxidase, alcohol oxidases.

7. Fuel cell according to claim 4, characterized in that the enzyme of the anodic compartment is glucose oxidase and the fuel is glucose.

8. Fuel cell according to claim 1 or claim 4, characterized in that the enzyme(s) of the anodic and/or cathodic compartment and the substrate(s) are introduced continuously or discontinuously into their respective compartments during the operation of the cell.

9. Fuel cell according to claim 1 or claim 4, characterized in that the enzyme(s) of the anodic and/or cathodic compartment are adsorbed on the anode and/or on the cathode.

10. Fuel cell according to claim 1, characterized in that the cell is a gas diffusion cell.

11. Fuel cell according to claim 1, characterized in that the cell is a cell operating in an aqueous medium.

12. Fuel cell according to claim 11, characterized in that enzyme(s) are introduced directly into the aqueous medium of the anodic and/or cathodic compartment, during the assembly of the cell.

* * * * *

UNITED STATES PATENT AND TRADEMARK OFFICE
CERTIFICATE OF CORRECTION

PATENT NO. : 7,655,345 B2
APPLICATION NO. : 10/503395
DATED : February 2, 2010
INVENTOR(S) : Feron et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1057 days.

Signed and Sealed this

Twenty-third Day of November, 2010

David J. Kappos
*Director of the United States Patent and Trademark Office*